US006493499B1

(12) United States Patent
Brandon et al.

(10) Patent No.: US 6,493,499 B1
(45) Date of Patent: Dec. 10, 2002

(54) WAVEGUIDE WINDOW

(76) Inventors: John Robert Brandon, Lislunnan, Northbrook, Micheldever, Winchester, Hampshire (GB); Christopher William Ogilvie Thompson, Mill Court, Alton, Hampshire (GB); Ricardo Simon Sussmann, 3 Frobisher Gardens, Guildford, GU1 2NT, Surrey (GB); Andrew David Garry Stewart, The Old Rectory, Ashampstead, Reading, RG8 8SH, Berkshire (GB)

( * ) Notice: Subject to any disclaimer, the term of this patent is extended or adjusted under 35 U.S.C. 154(b) by 0 days.

(21) Appl. No.: 09/647,927

(22) PCT Filed: Apr. 14, 1999

(86) PCT No.: PCT/ZA99/00013

§ 371 (c)(1), (2), (4) Date: Dec. 21, 2000

(87) PCT Pub. No.: WO99/53563

PCT Pub. Date: Oct. 21, 1999

(30) Foreign Application Priority Data

Apr. 15, 1998 (GB) ............................................ 9808005

(51) Int. Cl.[7] .............................. G02B 6/10; H01P 1/08

(52) U.S. Cl. ........................ 385/134; 385/140; 333/252

(58) Field of Search ................................ 385/134, 140; 333/252

(56) References Cited

U.S. PATENT DOCUMENTS

| | | | | | |
|---|---|---|---|---|---|
| 3,156,881 | A | * | 11/1964 | Bondley | 333/252 |
| 3,156,882 | A | * | 11/1964 | Bondley | 333/252 |
| 4,523,127 | A | * | 6/1985 | Moeller | 315/4 |
| 4,965,541 | A | * | 10/1990 | Okazaki | 333/252 |
| 5,784,517 | A | * | 7/1998 | Johanson | 385/146 |

* cited by examiner

*Primary Examiner*—Brian Sircus
*Assistant Examiner*—Michael C. Zarroli
(74) *Attorney, Agent, or Firm*—Oblon, Spivak, McClelland, Maier & Neustadt, P.C.

(57) ABSTRACT

A window for a waveguide for a beam of electromagnetic radiation. The window includes a layer of a material capable of allowing electromagnetic radiation to pass therethrough and a support on each side of the layer. Each support defines a passage for electromagnetic radiation. Further, the layer is provided with at least one recess formed in the periphery thereof.

25 Claims, 1 Drawing Sheet

WAVEGUIDE WINDOW

BACKGROUND OF THE INVENTION

1. Field of the Invention

This invention relates to a window, for example a window for a waveguide for a beam of electromagnetic radiation.

2. Discussion of the Background

Electromagnetic radiation, and more particularly microwave radiation, is generated in gyrotrons and other high power microwave sources. A beam of the radiation is generated and this passes along a waveguide to an exit port. The waveguide comprises a passage, generally of circular cross-section, having a window extending across it. The beam of electromagnetic radiation passes through the window. The window is used for the protection of the electromagnetic sources or detectors from environmental factors. The window may be made of a variety of materials such as sapphire, diamond and the like. Such windows are generally planar, although curved profiles have been suggested.

SUMMARY OF THE INVENTION

According to the present invention, a window for a waveguide for a beam of electromagnetic radiation, comprises a layer of a material capable of allowing electromagnetic radiation to pass therethrough and a support on each side of the layer, each support defining a passage for electromagnetic radiation, and the layer being provided with at least one recess formed in the periphery thereof.

Preferably a plurality of recesses are formed in the periphery of the layer, those recesses preferably being evenly spaced around the periphery. The number of recesses will vary according to the nature of the layer and will typically exceed six.

The depth of the recess or recesses into the layer will vary according to the nature of the material from which the layer is made, the size and shape of the layer and other such factors. For example, where the layer is disc-shaped, the depth of the recess or recesses may be chosen to reduce the peak level of hoop stresses in the layer.

In one form of the invention, each support is located inside the periphery of the layer and the or each recess has a depth equal to or less the distance of the supports from the periphery.

It is preferred that each recess is free of sharp corners, e.g. has a rounded end which extends into the layer.

Each support may take the form of a ring having a flange which bears against a surface of the layer. The flanges will generally extend outwards and away from the passage defined within the supports. To minimise expansion of the flanges, a retaining ring may be provided around the outwardly extending flanges. The retaining ring may be made of a material such as molybdenum.

The supports will generally be bonded to a surface of the layer by means of a braze or diffusion bond. The layer may take any suitable shape such as rectangular, but will generally be disc-shaped.

The material from which the layer is made will typically be sapphire, diamond, germanium, zinc selenide, silicon, doped silicon, silicon nitride, aluminium nitride or boron nitride. The window is preferably made of diamond. Such diamond is preferably produced using chemical vapour deposition (CVD).

The invention extends to a layer for use in a window as described above, such layer being of a material capable of allowing electromagnetic radiation to pass therethrough and being provided with at least one recess formed in the periphery thereof.

DESCRIPTION OF THE PREFERRED EMBODIMENTS

Figure 1:
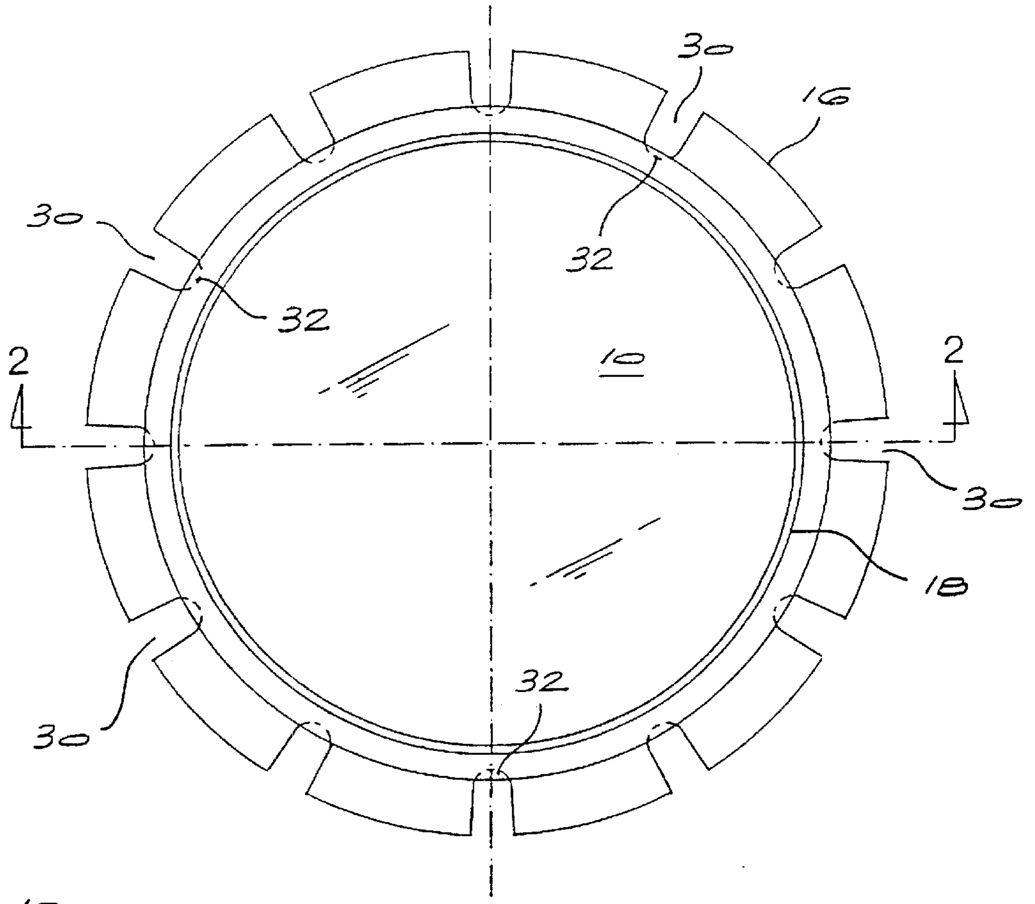
FIG. 1 is a plan view of an embodiment of a window of the invention.
Figure 2:
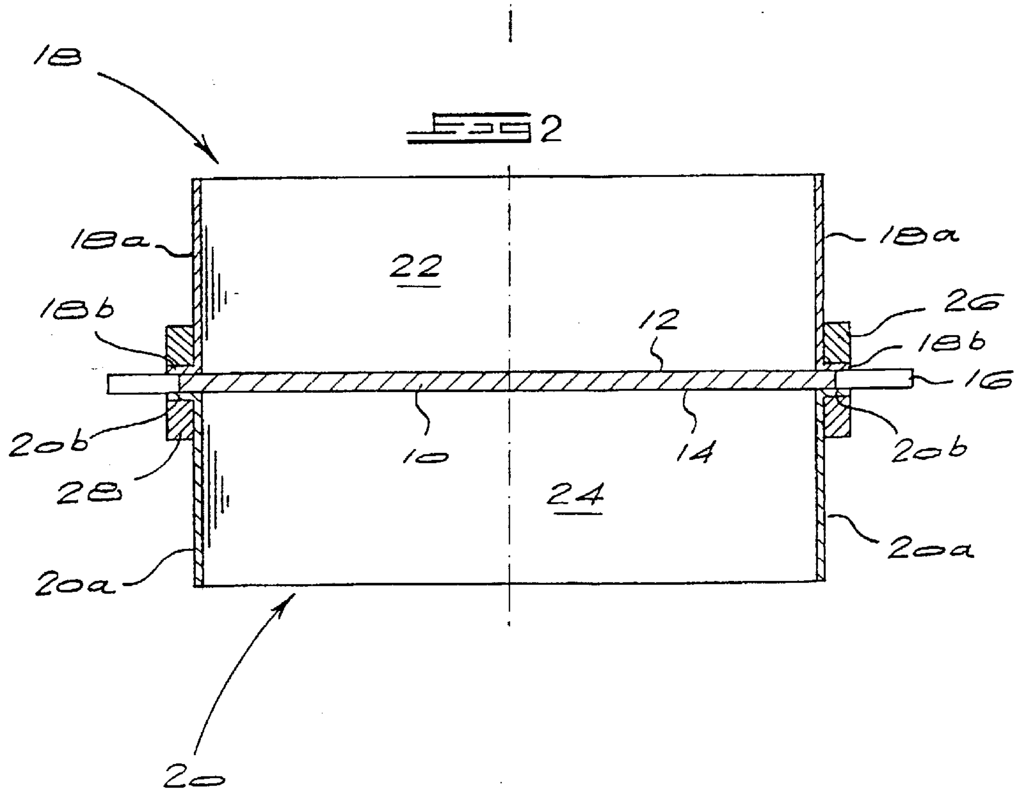
FIG. 2 is a section along the line 2—2 of FIG. 1.

An embodiment of the invention will now be described with reference to FIGS. 1 and 2. Referring to the drawings, there is shown a window comprising disc-shaped layer 10, preferably made of CVD diamond, having opposite major surfaces 12, 14 and a peripheral edge 16. The layer 10 is mounted between opposed supports or cuffs 18, 20. Each cuff comprises a ring section 18*a*, 20*a* and an outwardly extending flange 18*b*, 20*b*. The flange 18*b* bears against the surface 12, whilst the flange 20*b* bears against the surface 14. The flanges 18*b*, 20*b*, are bonded to the surfaces 12, 14 respectively, of the CVD diamond layer 10, by means of a diffusion bond. The bonding material will be chosen to suit the application. Examples of suitable materials are aluminium and gold and alloys thereof.

A passage 22 is defined within the cuff 18 and a passage 24 is defined within the cuff 20. The cuff 18 is in alignment with the cuff 20 so that the passages 22 and 24 have no discernible discontinuity.

Retaining rings 26 and 28 are provided around the outwardly extending flanges 18*b*, 20*b*. The retaining ring preferably has a coefficient of expansion which is comparable to that of the layer 10 and lower than that of the cuffs 18, 20. An example of a suitable material is molybdenum.

The cuffs 18, 20 will typically be made of a metal such as Inconel. The attachment of a CVD diamond layer to a metal cuff presents several problems. First, a compatible braze or diffusion bond must be chosen having adequate strength and high temperature creep resistance to withstand bakeout. Secondly, the metal cuffs must be chosen having a linear thermal expansion match to the diamond window. While primarily for the high temperature bonding process, this requirement also affects stresses encountered in subsequent vacuum bakeout treatments which can cause cumulative work hardening effects in some metal joints leading ultimately to fracture. Diamond has one of the lowest thermal expansion coefficients of any material and any metal cuff will expand considerably more than diamond over the 0–1000° C. temperature range causing mismatch stresses. Finally, the thermal variations from centre to edge in the CVD deposition process can lead to hoop stresses across the layer 10. The magnitude of hoop stresses can sometimes be sufficient to promote radial cracks propagating in from the edge of the disc. It is important to contain these cracks if the disc is to be considered for vacuum window applications. Even if the cracks are not present initially, the presence of the stresses can lead to cracking later during the lifetime of the window.

A plurality of recesses or slots 30 are provided around the periphery 16 of the disc-shaped layer 10. Each slot 30 extends into the layer 10 from the periphery 16 and each slot has a rounded end or base 32. The slots, it has been found, give rise to the following advantages:

1. The slots facilitate the use of alignment pins and fixtures, which are simpler and lower in cost, directly against the cuffs 18, 20 to ensure that accurate concentric alignment of the two cuffs and their bonding to the layer is achieved. A typically error of 0.3 nm in this regard can be reduced to better than 0.05 mm.

2. The use of slots reduces the peak level of hoop stresses that exist in the layer 10 particularly in the region between the cuffs 18, 20 and the edge 16. This in turn reduces the likelihood of uncontrolled radial cracks extending in from the edge 16. The number of slots required preferably exceeds six and each slot should have a depth equivalent to the region between the cuffs 18, 20 and the edge 16.

3. The thermal mismatch stresses between the cuffs 18, 20 and the layer 10 are reduced since the slotted layer is effectively more compliant in the region of the bonding. Twisting forces which may exist in the outer periphery of the layer 10 are reduced. The likelihood of bond failure during repeat thermal cycling is also reduced.

4. The slots can be used to modify the liquid cooling around the edge of the window in order to derive an advantage in the heat transfer.

The window described above may be mounted in a waveguide using methods and techniques known in the art.

What is claimed is:

1. A window for a waveguide for a beam of electromagnetic radiation, comprising:

a layer capable of allowing electromagnetic radiation to pass therethrough, the layer having at least one recess formed in a periphery portion thereof; and a plurality of supports disposed on side portions of the layer, respectively, the plurality of supports defining a passage for electromagnetic radiation, wherein the plurality of supports is located inside of the periphery portion of the layer and the at least one recess extends from the periphery portion to the plurality of supports at most.

2. A window according to claim 1, wherein the at least one recess comprises a plurality of recesses formed in the periphery portion of the layer.

3. A window according to claim 2, wherein the plurality of recesses are evenly spaced around the periphery portion.

4. A window according to claim 1, wherein the at least one recess comprises at least six recesses.

5. A window according to claim 1, wherein the at least one recess has an inner surface portion which is free of sharp corners.

6. A window according to claim 5, wherein the at least one recess has a rounded end which extends into the layer.

7. A window according to claim 1, wherein the plurality of supports each have a form of a ring having a flange which bears against a surface portion of the layer.

8. A window according to claim 7, wherein the flanges of the plurality of supports extend outwards and away from the passage defined within the plurality of supports.

9. A window according to claim 8, further comprising a retaining ring provided around the flanges.

10. A window according to claim 9, wherein the retaining ring comprises molybdenum.

11. A window according to claim 1, wherein the layer comprises a material selected from the group consisting of sapphire, diamond, germanium, zinc selenide, silicon, doped silicon, silicon nitride, aluminum nitride and boron nitride.

12. A window according to claim 1, wherein the layer comprises CVD diamond.

13. A window according to claim 1, wherein the layer is disc-shaped.

14. A window for a waveguide for a beam of electromagnetic radiation, comprising:

a layer capable of allowing electromagnetic radiation to pass therethrough, the layer having at least one recess formed in a periphery portion thereof; and a plurality of supports disposed on side portions of the layer, respectively, the plurality of supports defining a passage for electromagnetic radiation, wherein the at least one recess has an inner surface portion which is free of sharp corners.

15. A window according to claim 14, wherein the at least one recess comprises a plurality of recesses formed in the periphery portion of the layer.

16. A window according to claim 15, wherein the plurality of recesses are evenly spaced around the periphery portion.

17. A window according to claim 14, wherein the at least one recess comprises at least six recesses.

18. A window according to claim 14, wherein the at least one recess has a rounded end which extends into the layer.

19. A window according to claim 14, wherein the plurality of supports each have a form of a ring having a flange which bears against a surface portion of the layer.

20. A window according to claim 19, wherein the flanges of the plurality of supports extend outwards and away from the passage defined within the plurality of supports.

21. A window according to claim 20, further comprising a retaining ring provided around the flanges.

22. A window according to claim 21, wherein the retaining ring comprises molybdenum.

23. A window according to claim 14, wherein the layer comprises a material selected from the group consisting of sapphire, diamond, germanium, zinc selenide, silicon, doped silicon, silicon nitride, aluminum nitride and boron nitride.

24. A window according to claim 14, wherein the layer comprises CVD diamond.

25. A window according to claim 14, wherein the layer is disc-shaped.

* * * * *